United States Patent

Dymott et al.

Patent Number: 5,855,046
Date of Patent: Jan. 5, 1999

[54] CLIP

[76] Inventors: David Moreton Patrick Dymott, 1 Shelvers Spur, Tadworth, Surrey, KT20 5QE, United Kingdom; Clifford Leslie Bean, 20 Chiltern Drive, Surbiton, Surrey, KT5 8LN, United Kingdom

[21] Appl. No.: 843,984

[22] Filed: Apr. 17, 1997

[30] Foreign Application Priority Data

Apr. 18, 1996 [GB] United Kingdom .................. 9608025

[51] Int. Cl.⁶ ................................................. A44B 21/00
[52] U.S. Cl. ............................... 24/507; 24/499; 24/508; 24/511
[58] Field of Search ............................. 24/507, 508, 500, 24/511, 499

[56] References Cited

U.S. PATENT DOCUMENTS

| | | | |
|---|---|---|---|
| 2,197,310 | 4/1940 | Lincoln | 24/507 |
| 2,766,500 | 10/1956 | Chanko | 24/507 |
| 2,815,777 | 12/1957 | Iraids | 24/507 |
| 3,135,034 | 6/1964 | Fauteux | 24/507 |
| 3,239,902 | 3/1966 | Cohen | 24/507 |
| 3,780,402 | 12/1973 | Takabayashi | 24/507 |
| 3,914,828 | 10/1975 | Noda | 24/507 |
| 4,192,602 | 3/1980 | Lamoreaux, Jr. | 24/507 |
| 5,425,312 | 6/1995 | Tack, Jr. | 105/225 |

FOREIGN PATENT DOCUMENTS

| | | |
|---|---|---|
| 1012730 | 12/1965 | United Kingdom . |
| 1392216 | 4/1975 | United Kingdom . |

*Primary Examiner*—Victor N. Sakran
*Attorney, Agent, or Firm*—Fish & Richardson P.C.

[57] ABSTRACT

A photographic film clip having gripping jaws (3,5) adapted to provide a soft gripping surface arranged to hold an article between the jaws of the clip without damage to the article. The clip has a metal body (1) with operating springs (2). The jaws are covered with a soft material (6) such as silicon rubber.

7 Claims, 2 Drawing Sheets

CLIP

This invention is concerned with the provision of an improved spring operated clip provided with two gripping jaws between which an object, such as a length of film, can be firmly held. A known form of clip is made of metal and each gripping jaw has teeth that can bite into an article being held by the clip so that the article is firmly held. Known clips of the above kind are effective but may, when in use, damage the article being held by the clip. Known clips of the above kind are hereinafter referred to as "known metal clips".

Such known metal clips are used for many purposes, for example in the developing process of photographic films during which the films may be hung up, using the known metal clips and may then be immersed in developing chemicals in a developing tank. The known metal clips may damage the end of a film but in accordance with known photographic technique that damage is not of much significance. However, a new photographic technique is now becoming popular, usually called the Advanced Photo System or APS, in accordance with which damage to the film is significant and cannot be tolerated.

It is therefore an object of the present invention to provide a spring operated clip that will hold an article e.g. a photographic film, firmly but that will not damage the article.

In accordance with the present invention we provide a spring operated clip in which the gripping jaws are adapted to provide a soft gripping surface so that an article held between the jaws of the clip is firmly secured in position but is not damaged. The body of the clip may be made of metal, e.g. surgical stainless steel (BS 316) and the jaws may be padded or covered, where the jaws contact the article being held, with a soft preferably slightly tacky (i.e. slightly sticky) material such as silicone rubber. This material has the particular advantage that the developing solution increases its tackiness and therefore its ability to grip film. The soft covering or padding on or over the surface of the jaws grips articles such as a photographic film firmly so that the film cannot slip out of the clip but at the same time the film is not damaged so that after developing the film can be rewound into a spool in accordance with the new APS technique.

In order that the invention may more clearly be understood reference is now directed to the attached drawings given by way of example in which.

Figure 1:
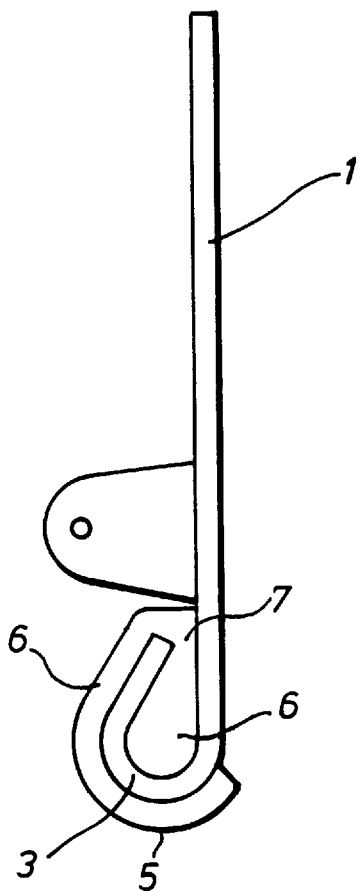
FIG. 1 is an enlarged side elevation of part of a clip constructed in accordance with the invention.
Figure 2:
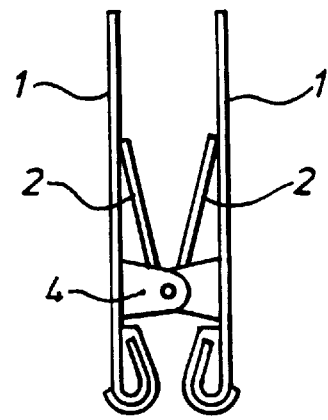
FIG. 2 is a side elevation of a complete clip constructed in accordance with the invention.
Figure 3:
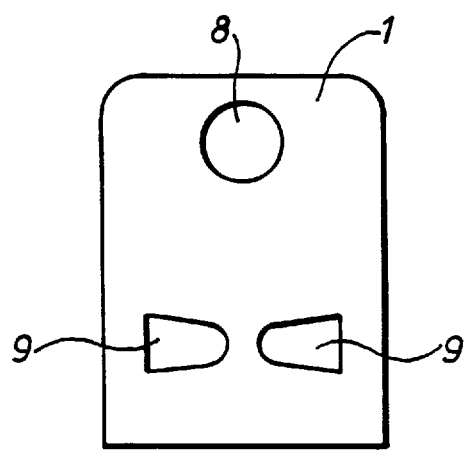
FIG. 3 is a front elevation of the clip of FIG. 2.

Referring to FIGS. 1, 2 and 3, a clip in accordance with the invention has a metal body 1 with operating springs, 2 and jaws 3. The springs 2, as in known metal clips, are disposed between two spaced apart sides of the body 1 interconnected, as shown, at 4. The sides of the body are substantially straight along the major part of their length and at the bottom are curved outwardly to form the gripping jaws 5. The jaws are preferably smooth, i.e. without teeth, and are covered with a soft material such as silicone rubber as shown at 6. The silicone rubber covering may be adhesively applied or otherwise secured to the metal of the clip or may simply be laid over the metal in which case the covering 6 may be given a bulbous end which is enclosed within the outwardly curved bottom ends of the body 1 of the clip so that the bulbous ends are bigger than the mouth 7 where the outwardly turned ends of the body are separated from the straight sides.

With particular reference to FIG. 3, the front elevation shows three apertures punched through the body 1. The first, preferably circular, aperture 8 may be used to hang the clip or otherwise secure it. The remaining two apertures 9 result from a punching and folding process which produces the interconnecting portions 4.

Figure 5:
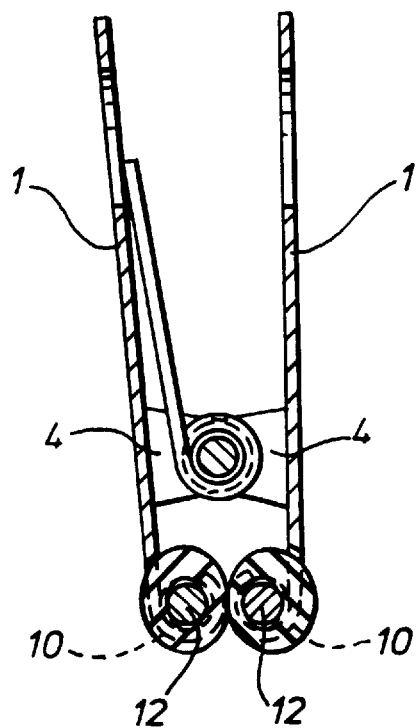
FIG. 5 is a section along line A—A of FIG. 4 of a complete clip.
Figure 4:
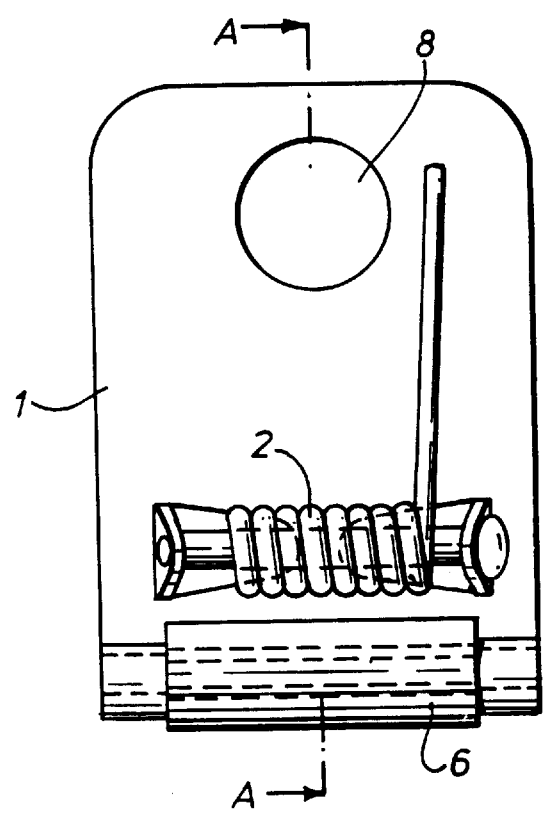
FIG. 4 is a front elevation of part of an alternative embodiment of a clip constructed in accordance with the invention.

With reference to FIGS. 4 and 5, and alternative arrangement for the jaws is shown. A similar curvature to that shown in FIGS. 1 and 2 is applied to the body 1 at the lower regions 10.

The regions 10 are arranged to retain respective steel pins 12 which extend along a line running transverse to the plane of the figure.

With reference also to FIG. 4, the steel pin passes through a tube of the covering 6. The covering 6 is retained both by the passage of the pins 12 and also by the lower regions 10 of the body 1 which act as end stops to prevent the cover 6 sliding longitudinally along the pin.

In other respects this second embodiment of the clip is the same as the first embodiment shown in FIGS. 1 to 3.

In the preferred embodiments of the invention we have therefore provided a spring operated clip especially designed for use with photographic films wherein the clip comprises a metal body shaped to provide gripping jaws, the metal jaws being provided with a covering of soft material such as silicone rubber to prevent the jaws, when closed, from damaging the film.

We claim:

1. A photographic film clip comprising a body having gripping jaws adapted to provide a soft gripping surface arranged to hold an article between the jaws of the clip without damage to the article, wherein the body includes a curved portion defining a cavity having a narrowed mouth portion, and the jaws are padded or covered where the jaws contact the article with a covering; the covering comprising a soft material, and having a bulbous portion configured to fit within the cavity and to be larger than the narrowed mouth portion thereby causing the covering to be retained by the curved portion of the body.

2. A clip according to claim 1, wherein the body of the clip is constructed from a metallic material such as surgical stainless steel.

3. A clip according to claim 1, wherein the covering material is tacky.

4. A clip according to claim 1, wherein the covering encircles and is retained by a pin fixed to the body of the clip.

5. A clip according to claim 1 wherein the body is formed from a pair of flat metal sheets each rolled at one end to form a curved portion forming the jaws and having pressed and folded hinge members for engagement with a hinge pin to hingably attach the pair of sheets together.

6. A clip according to claim 5, wherein the hinge pin serves to retain the coiled body of a spring.

7. A clip according to claim 1, wherein the covering material comprises silicon rubber.

* * * * *